COMBINATION SEMI-CYLINDRICAL MAGNIFIER AND GUIDE BAR

Filed Feb. 26, 1965

INVENTORS
HELGE S. KOENIG
RAGNA HÖST SCHJERVEN
Nolte & Nolte
ATTORNEYS

United States Patent Office 3,429,638
Patented Feb. 25, 1969

3,429,638

COMBINATION SEMI-CYLINDRICAL MAGNIFIER AND GUIDE BAR

Helge S. Koenig and Ragna Höst Schjerven, both of Martiusstr. 7, 8000 Munich 23, Germany, and Friedrich Dehler, Siegesstr. 5, 8000 Munich 23, Germany Filed Feb. 26, 1965, Ser. No. 435,426
Claims priority, application Germany, Feb. 27, 1964, H 51,861
U.S. Cl. 350—241 4 Claims
Int. Cl. G02b 5/04, 27/02

ABSTRACT OF THE DISCLOSURE

A reading glass assembly for providing, for people of weak vision, a magnified image of printed text. The assembly includes an elongated guide bar having at least on one side a lower straight edge adapted to engage the side of an open book to be guided along the latter side of the book. This guide bar is formed intermediate its ends with a transverse opening passing therethrough. An elongated magnifying lens whose cross-section matches that of the transverse opening extends slidably through the latter transversely of the guide bar and has a lower surface which is adapted to rest on the page of the book with the elongated magnifying lens situated over the text to provide a magnified image thereof. This assembly of magnifying lens and guide bar can be shifted down the page of the book with the assembly guided by engagement of the straight edge of the guide bar with the side of the open book, so that in this way by extending the elongated magnifying lens over the printed text it is possible for the reader to achieve a magnified image of the printed text as the assembly is advanced down a page.

The present invention relates to reading devices of the kind consisting of a magnifying glass body usually having the form of a semi-cylindrical glass rod.

The invention has for its object to provide means whereby such reading magnifying lenses can be given a favorable use, the reading prism being provided with a guiding bar by means of which the reading lens can be guided along the edge of a book or other object provided with text so that the reading lens can be led down along the text lines parallel therewith.

Said guiding bar in a preferred embodiment consists of a parallelepipedic or prismatic elongated body provided with a guiding edge on one or both sides and being provided with a crosswise extending aperture the cross-section of which corresponds to the reading lens. Said aperture preferably is lined with a soft material, for instance, chamois.

The guiding bar may also comprise a casing in which the reading lens can be kept when not in use. Said casing can for instance be formed integrally with the guiding bar i.e. in its body is provided a channel having cross-section corresponding to that of the reading lens in which channel said lens can be inserted when stored out of use. Also this storing casing preferably is lined with soft material.

To have a better understanding of the invention, reference is had to the drawing in which there is shown an embodiment which is further described below.

Figure 1:
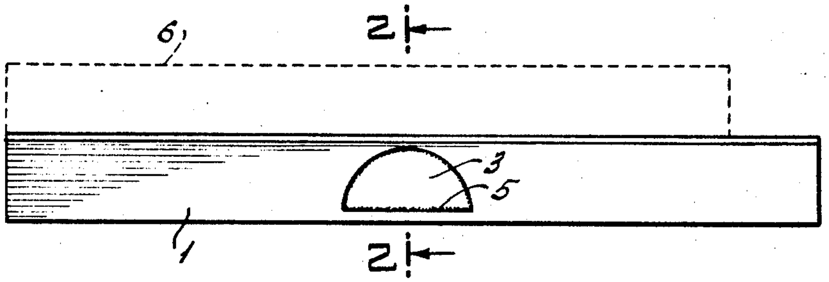
FIG. 1 shows a guiding bar acording to the invention seen from one side.
Figure 2:
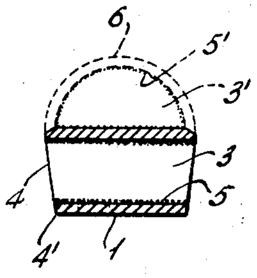
FIG. 2 is a cross-section after the line 2—2 of FIG. 1.

In the drawing is further with broken lines indicated a modification of the guiding bar whereby this also comprises a storing casing for the reading lens.

The guiding bar according to the example shown in the drawing consists of a substantially parallelepipedic elongated body 1 made from convenient rigid material for instance wood, artificial material or the like. Along both sides the guiding bar 1 is provided with straight guiding edges 4 intended for resting against for instance the side of the edge of a book or other object provided with text. Across the guiding bar 1 is provided an aperture 3, the cross-section of which corresponds to the reading lens. The aperture 3 is lined with chamois or the like as indicated at 5.

Figure 3:
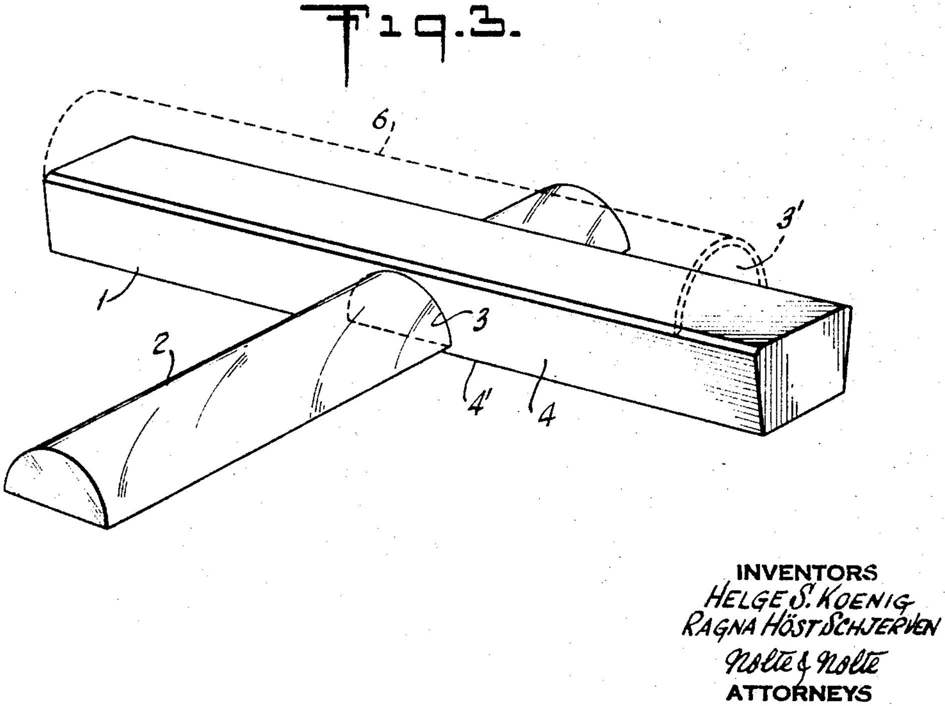
FIG. 3 shows a guiding bar according to FIG. 1 seen perspectively with the reading lens inserted in its crosswise extending aperture.

In FIG. 3 the parts are assembled, the reading lens 2 being inserted in the aperture 3 in the guiding bar 1. In use said guiding bar 1 is led with the edge 4 sliding along the edge of a book or the like, whereby the reading lens 2 with desired speed manually is displaced downward parallel with the lines of the text. The edge 4 is preferably so arranged that its lower contact surface 4' extends on somewhat below the lower plane surface of the aperture 3.

Said aperture, however, also may be provided in such a way that its bottom surface is omitted due to the fact that it lies in the same plane as the bottom surface of the guiding bar 1. In this case, however, guiding means must be arranged for instance in the form of grooves extending along the sides of the reading lens 2 cooperating with corresponding protrusions within the aperture 3 or the cross-section of the reading lens can comprise more than one semicircle. Such an embodiment is specially convenient when the reading lens is used for reading of text as for instance placed within a frame. The outer edge of the guiding bar i.e. that edge being remote from the observer in FIG. 3 will then be the active guiding edge sliding along the text frame and the reading lens will rest directly against the text.

According to a preferred embodiment the guiding bar 1 can be provided with a mantle or a casing in which the reading prism can be kept when out of use. In the drawing this modification is indicated in broken lines 6. The aperture 3' of the casing 6 preferably also is lined with soft material as shown at 5'. Chamois will be a convenient material, thereby the reading prism is not only protected during the storing in the casing and in the aperture 3, but the soft material also serves to keep the glass surfaces of the reading lens clean.

It will be understood that the embodiment shown in the drawing and described above only is meant for illustrating the inventive idea and that modifications can be made within the scope of the invention. Thus the guiding bar 1 could be modified in a series of ways for instance in giving a good grip for the hand by means of which the bar is led along for instance the edge of a book or the bar can be given T-cross-section. In this case the reading lens can be kept in the T-formed branch and being pulled out there for reading use.

We claim:

1. A reading glass assembly comprising an elongated guide bar having at one side a lower straight guiding edge for engaging the side of an open book to be guided thereby, said guide bar being formed intermediate its ends with an opening of predetermined cross section passing transversely therethrough, over said edge, and an elongated magnifying lens having a cross section matching that of said opening and passing slidably through the latter across said guiding bar to engage lines of text on a page of a book, while said guide bar is guided by a side of the book, for providing the reader with a magnified image of the text the guide bar and the elongated magnifying lens therewith being slidable downwardly along the page of the book.

2. The combination of claim 1 and wherein said guide bar is of a symmetrical configuration with respect to a longitudinal central vertical plane passing longitudinally therethrough, so that either side of the guide bar can be used with either side of a book.

3. The combination of claim 1 and wherein said guide bar has an upper surface carrying an elongated hollow casing which is open at least at one end for storing said magnifying lens in said casing.

4. The combination of claim 1 and wherein said guide bar is of substantially rectangular cross section, said opening thereof and said lens both having semicylindrical cross sections and said opening being lined with chamois, said bar having an upper surface on which said lens can be stored.

References Cited

UNITED STATES PATENTS

| | | | |
|---|---|---|---|
| 432,872 | 7/1890 | Green | 350—243 |
| 1,884,968 | 10/1932 | Bloch | 350—242 |
| 2,527,071 | 10/1950 | Pierce | 350—239 |
| 2,957,390 | 10/1960 | Baukus | 350—241 |
| 2,649,838 | 8/1953 | Krause et al. | 350—243 |
| 2,746,347 | 5/1956 | Gaire | 350—242 |

DAVID SCHONBERG, *Primary Examiner.*

MICHAEL J. TOKAR, *Assistant Examiner.*

U.S. Cl. X.R.

33—76